(No Model.) 7 Sheets—Sheet 2.

C. O. WHITE.
MACHINE FOR SIZING BARREL HOOPS AND SECURING ENDS THEREOF.

No. 597,701. Patented Jan. 18, 1898.

WITNESSES.
J. Jessen
W. E. Cooley

INVENTOR.
CLARENCE O. WHITE.
BY Paul A. Hawley ATT'YS.

(No Model.) 7 Sheets—Sheet 4.

C. O. WHITE.
MACHINE FOR SIZING BARREL HOOPS AND SECURING ENDS THEREOF.

No. 597,701. Patented Jan. 18, 1898.

WITNESSES.
J. Jessen.
W. E. Cooley.

INVENTOR.
CLARENCE O. WHITE.
By Paul & Hawley Attys.

(No Model.) 7 Sheets—Sheet 7.

C. O. WHITE.
MACHINE FOR SIZING BARREL HOOPS AND SECURING ENDS THEREOF.

No. 597,701. Patented Jan. 18, 1898.

WITNESSES.
J. Jessen
W. E. Gooley.

INVENTOR.
CLARENCE O. WHITE.
BY Paul & Hawley atty.

UNITED STATES PATENT OFFICE.

CLARENCE O. WHITE, OF MINNEAPOLIS, MINNESOTA, ASSIGNOR TO THE MINNEAPOLIS COOPERAGE COMPANY, OF SAME PLACE.

MACHINE FOR SIZING BARREL-HOOPS AND SECURING ENDS THEREOF.

SPECIFICATION forming part of Letters Patent No. 597,701, dated January 18, 1898.

Application filed September 15, 1896. Serial No. 605,891. (No model.)

*To all whom it may concern:*

Be it known that I, CLARENCE O. WHITE, of the city of Minneapolis, county of Hennepin, State of Minnesota, have invented certain new and useful Improvements in Machines for Sizing Barrel-Hoops and Securing the Ends Thereof, of which the following is a specification.

This invention relates to improvements in machines designed for sizing barrel-hoops and, after they have been brought to the proper size, firmly securing their ends together, and thus putting the hoops in condition for being driven upon the barrel and rendering it impossible for them to pull apart while being so driven or while in use.

To these ends the invention consists generally in the constructions and combinations hereinafter described, and particularly pointed out in the claims.

The invention will be more readily understood by reference to the accompanying drawings, forming part of this specification, and in which—

In the drawings, 2 represents the frame or casing of the machine, which is preferably formed as a hollow casting of suitable size and shape and providing bearings and supports for the various parts of the mechanism. Upon this casing is the standard 3, provided with suitable bearings for the main or driving shaft 5. This shaft is provided with a suitable driving-pulley 7. An upright shaft 9 is mounted in bearings in the standard 3, and the top of the casing 2 and the shafts 5 and 9 are connected together by means of the bevel-gears 11 and 13. From these two shafts the various parts of the machine are driven. The shaft 5 is provided at its forward end with the grooved cam 15, by means of which the plunger is reciprocated, as hereinafter described, and the shaft 9 is provided with the two cams 17 and 19, which respectively operate the wire-feeding and the staple-clenching devices, as hereinafter described.

Figure 1:
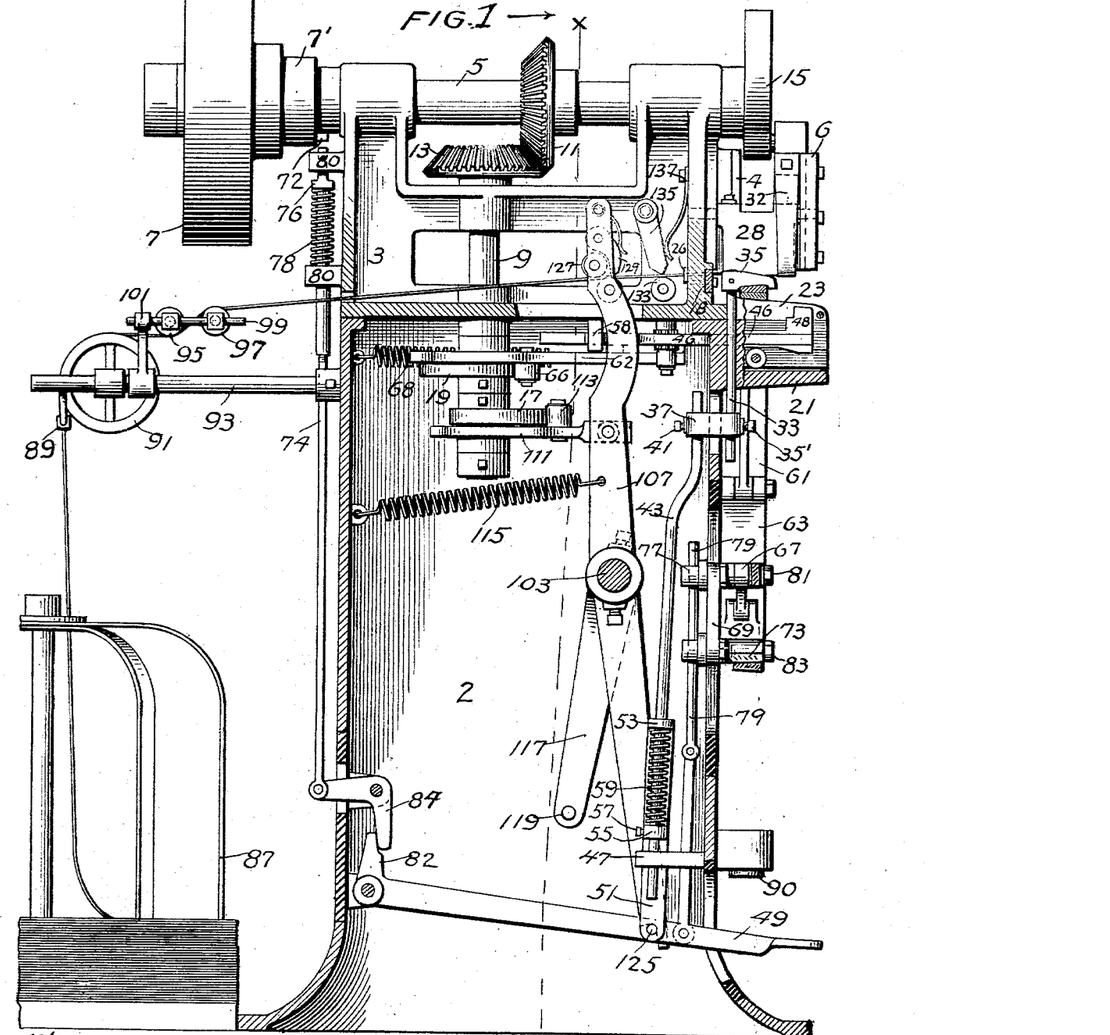
Figure 1 is a vertical section of a machine embodying my invention.
Figures 2, 5, 6:
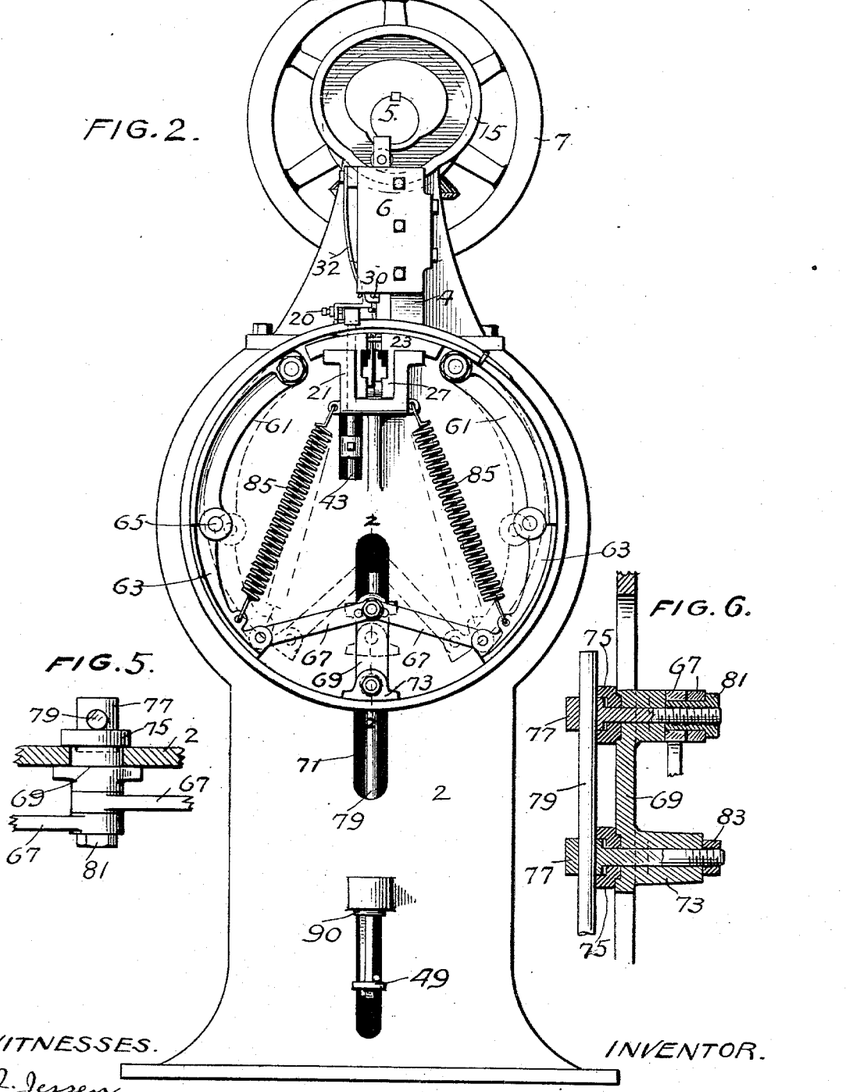
Fig. 2 is a front elevation of the same, showing a barrel-hoop in position therein, one of the staple-fastenings being applied to the hoop and the machine being in position for applying the other fastening.
Figs. 5 and 6 are details of portions of the hoop-sizing device.
Figures 12, 13, 14, 15:
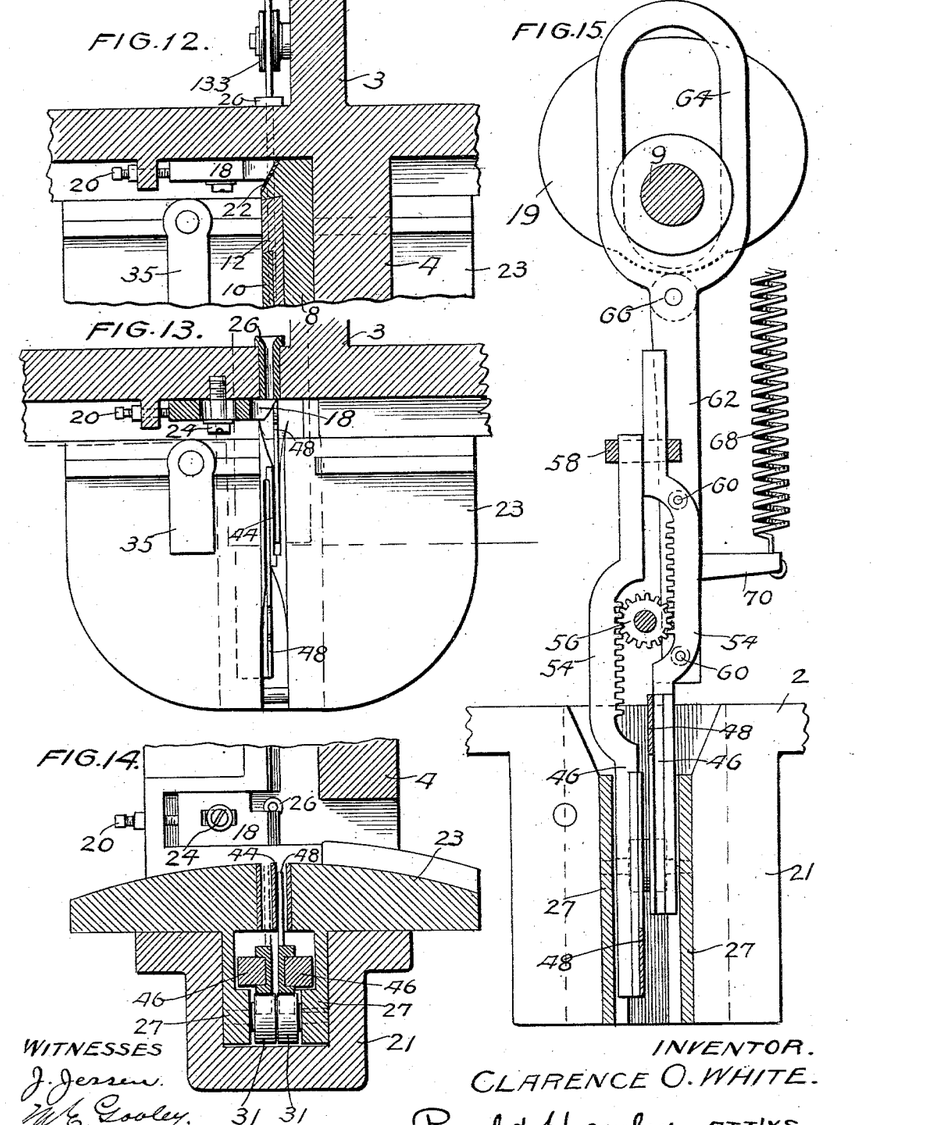
Figs. 12, 13, and 14 are details showing the means for cutting the wire and for bending the ends of the staples around the hoop and inserting the points into the hoop.
Fig. 15 is a detail showing the means for imparting motion to the clencher-bars.
Figures 16, 17, 18, 19, 20, 21:
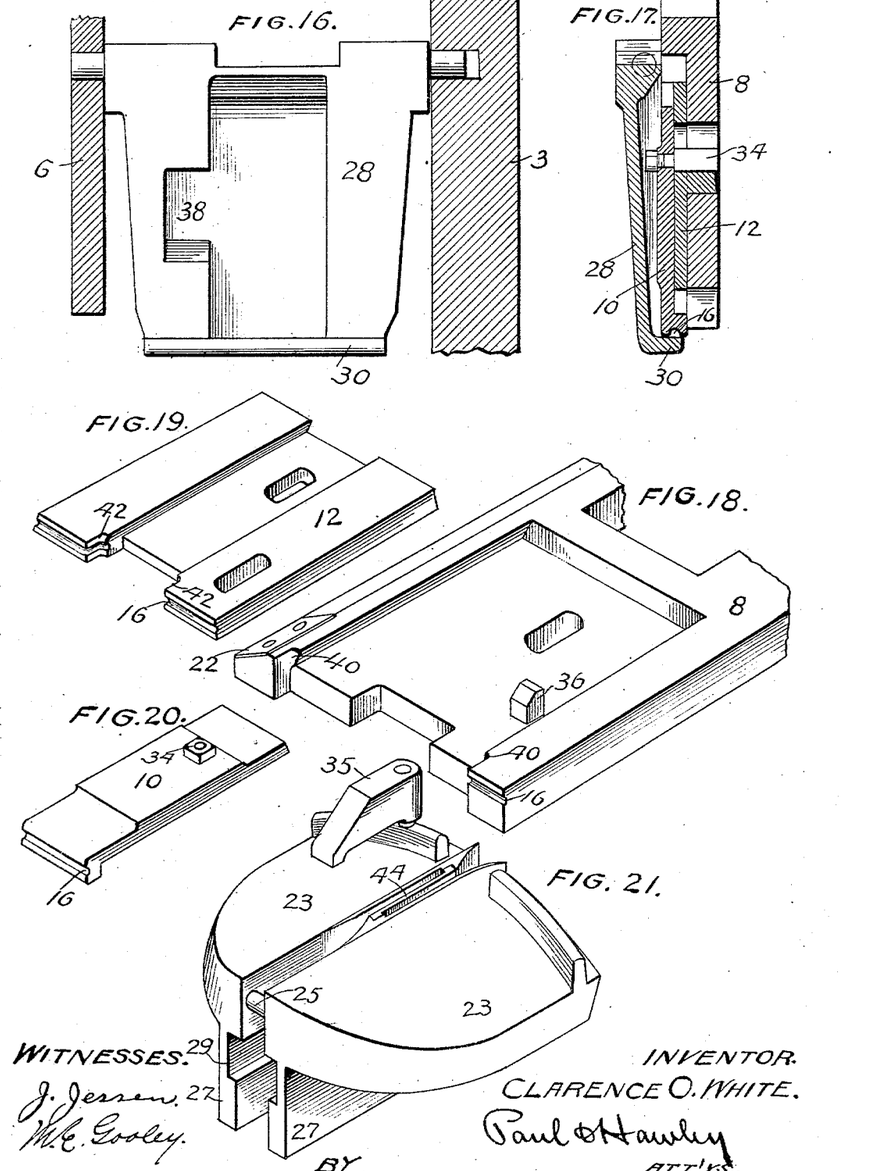
Figs. 16, 17, 18, 19, and 20 are details of the plunger and its coöperating slides by means of which the staple is formed.
Fig. 21 is a detail perspective of the anvil upon which the ends of the hoop are placed and showing also the means for clamping the hoop in position while the staple is being inserted.

The front of the casing 2 is provided with a projection 21, (see Figs. 1 and 2,) having a recess in its top and having, preferably, an open end, so that said projection forms a trough-shaped recess within which the clencher slides or bars, hereinafter described, are arranged. Upon the projection 21 is arranged the anvil 23, (see Figs. 1, 2, 14, and 21,) this anvil having, preferably, a rounded upper surface and consisting of two parts secured together by pins 25, the parts being so arranged that there is a recess between them, as shown in Figs. 14 and 21. Each part of the anvil 23 has a depending flange 27, with a groove 29 upon its inner surface, and rolls 31 are mounted between the two flanges 27, below the grooves 29, being secured upon suitable pins that pass through said flanges. The anvil 23 is placed upon the projection 21, with the flanges 27 extending into the recess in said projection, as shown in Figs. 2 and 14. A vertically-sliding rod 33 passes through the rear portion of the anvil 23 and through the projection 21 and is provided upon its upper end with the hoop clamp or dog 35. The lower end of the rod 33 is connected by a set-screw 35 to a slide 37, that moves vertically in a slot in the front of the casing 2. This slide is also secured by a set-screw 41 to the upper end of a rod 43, arranged, preferably, inside of the casing 2 and having its lower end passing through a guide-lug 47. A treadle 49 is pivoted within the casing 2, and its forward end passes through a slot in the front of said casing and is adapted to be depressed by the application of the foot of the operator to the end of the treadle. A strap 51 is pivoted to this treadle, and its upper end is provided with a lug 53, through which the rod 43 passes. A collar 55 is secured upon the rod 43 by means of a set-screw 57, and a spring 59 is arranged between the lug 53 and the collar 55. By this means when the treadle is depressed the hoop-clamp 35 is drawn toward the top of the anvil and is held with a yielding pressure, thereby clamping the ends of the hoop upon the anvil, as shown in Figs. 1 and 2.

The hoop which is to be sized and fastened is placed in position with its ends upon the anvil 23 and under the clamp 35. The hoop will usually need to be expanded, so as to be brought to the exact size desired before its ends are fastened, and for this purpose I prefer to provide means, operated from the treadle 49, that will expand the hoop to the exact size required and will hold it in such expanded position while its ends are being secured. The construction of the expander may be varied without departing from the principle of the operation of the machine, and I have shown in the drawings several different forms of such expander. As shown in Figs. 1, 2, 5, and 6, the expander consists of the curved bars 61, pivoted to the front of the casing at each side of the anvil 23 and having other bars 63 pivotally secured to their ends by means of the hinged joints 65. The ends of the curved bars 63 are connected by the links 67 to the slide 69, which is arranged to move vertically in a slot 71 in the wall of the casing 2. This slide has formed upon its lower end the curved lug 73, which strikes the hoop at a point directly under the anvil 23. At the rear of the slide 69 I preferably place the two washers 75, through which pass the eye-bolts 77. The rod 79 passes through the eyes in these bolts and said bolts pass through the slide 69, one of said bolts passing through the ends of the links 67, and the ends of said bolts are held by nuts 81 and 83, the nut 81 preferably being provided with an extension which passes through the links 67, as shown in Fig. 6. Springs 85 are connected to the ends of the curved bars 63 and also to the casing 2 and serve to raise the slide 69 and draw the bars 63 inward when the treadle 49 is released.

Figures 22, 23, 24:
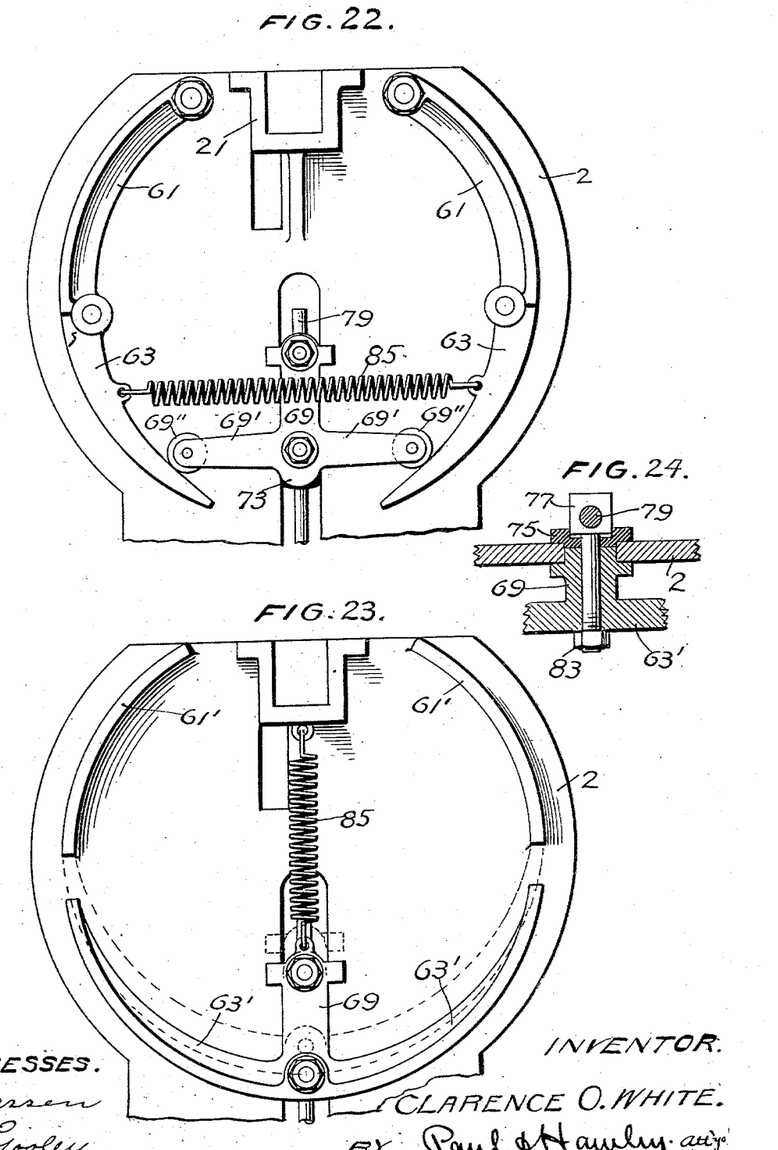
Fig. 22 is a front elevation showing one form of device that is used for expanding the hoop and bringing it to the desired size.
Fig. 23 is a front elevation of another form of hoop-expander.
Fig. 24 is a detail of a portion of the expander shown in Fig. 23.

In Fig. 22 I have shown a single spring 85, connecting the curved bars 63, and I have shown the slide 69 provided with arms 69', carrying rollers 69'', which bear upon the ends of the curved bars 63, so that by depressing said slide said bars are pressed outward in substantially the same manner as is done with the construction shown in Fig. 2. In this instance, however, the bars 63 are made longer, so that there is only a short space between their ends, and the lug 73 may be omitted, or this lug may be arranged upon the bottom of the slide, as shown in Fig. 22. In Figs. 23 and 24 I have shown another modification of the expanding device. As here shown, stationary curved bars 61' are arranged upon the front of the casing at each side of the anvil 23, and the slide 69 has formed integrally with it or secured to it a substantially semicircular bar 63', which extends on both sides of said slide, its ends substantially coinciding with the ends of the fixed bars 61'. In this instance the spring 85 is connected directly to the slide 69 and to the casing of the machine, so that when the lever is released the slide is raised and the curved bar 63' is moved into the position indicated by dotted lines in Fig. 23. It will be seen that in each instance the hoop may be placed over the expanding device, its ends being overlapped upon the top of the anvil 23 and under the clamp 35. The treadle being then depressed, the clamp 35 will be brought on top of the overlapped ends of the hoop with a yielding pressure. At the same time the expanding devices are brought against the inner surface of the hoop and expand the hoop to the required size, the overlapping ends of the hoop sliding upon each other under the clamp 35 a sufficient amount for this purpose. When the hoop is brought to the desired position, it is there held while the staple is formed, passed around, and secured to the overlapped ends of the hoop.

I will next proceed to describe the means by which the wire is fed, the staple formed, passed around the overlapped ends of the hoop, and its points embedded therein.

Figures 3, 4:
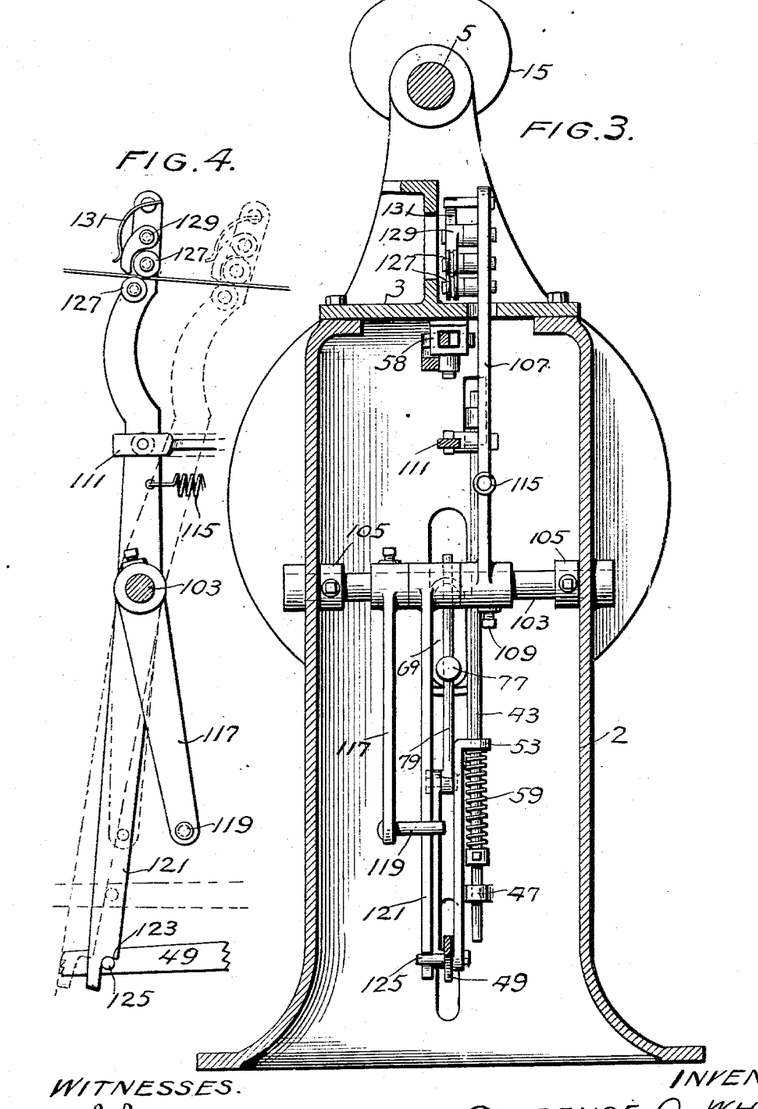
Fig. 3 is a transverse vertical section, looking from the rear end of the machine.
Fig. 4 is a detail of the means for feeding the wire.

The wire is fed from a suitable reel 87 through a guide 89 and over a wheel 91, that is supported upon an arm 93 upon the casing 2. From the wheel 91 the wire passes under and over the straightening-rolls 95 and 97, that are adjustably mounted upon a rod 99, supported upon the arm 93 by a suitable standard 101. The wire passes through the upper part of the casing 2 and through a hole in the front wall of the casing at one side of the hoop-clamp 35. A transverse shaft 103 is mounted in the casing 2 and is held in position by means of the collars 105. A vertical arm 107 is secured to this shaft by means of a set-screw 109, and said arm has connected to it a slotted plate 111, through which the shaft 9 passes. The plate 111 carries a roll 113, that bears against the cam 17. A spring 115 is connected to the arm 107 and holds the roll 113 at all times in engagement with the surface of the cam 17. By this means as the shaft 9 is rotated the arm 107 is reciprocated, being moved from the position shown in full lines in Fig. 4 to the position shown in dotted lines in the same figure. Secured upon the shaft 103 is a depending arm 117, provided at its lower end with a pin 119. Another arm 121 is arranged loosely upon the shaft 103, (see Figs. 1, 3, and 4,) and the lower end of this arm is provided with a notch 123, that is adapted to engage a pin 125 in the treadle 49, so that whenever the treadle is depressed the notched end of the arm 121 drops over the pin 125 and holds said treadle in its depressed position until the arm 117 is swung forward and by engagement with the arm 121 releases said treadle and permits it to be raised by the means hereinbefore described. The upper end of the arm 107 is provided with the rolls 127, between which the wire passes, and is also provided with a feed-dog 129, that is held against the wire by the spring 131. The wire also passes over the stationary roll 133 and beneath the dog 135, held in position against the wire by the spring 137. By this means each time the upper end of the arm 107 is swung forward or toward the anvil 23 the wire is moved a sufficient amount to form one staple. Upon the return movement of the arm 107 the wire is held by the dog 135, and the dog 129 slides over the wire without moving it. In this way at the proper intervals the wire is fed to form the staples or fastenings that are passed around the overlapped ends of the hoop.

Figure 7:
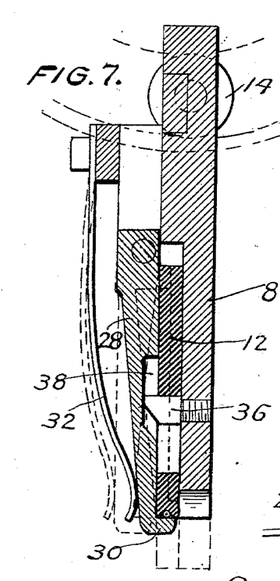
Figs. 7, 8, 9, 10, and 11 are details showing the movements of the staple-forming and the setting mechanism.
Figure 8:
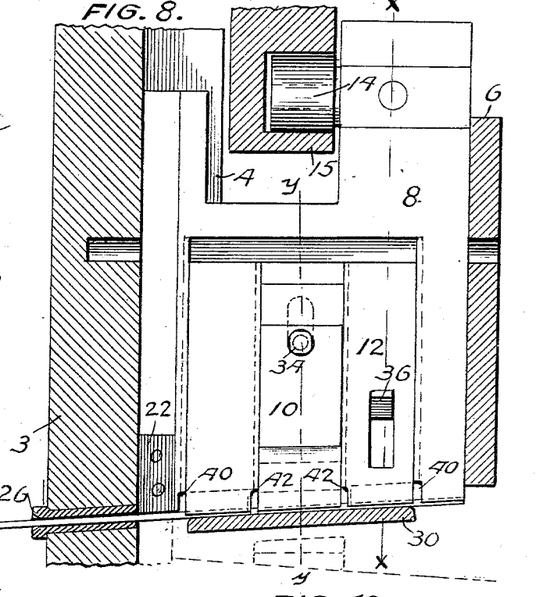
Figures 9, 10, 11:
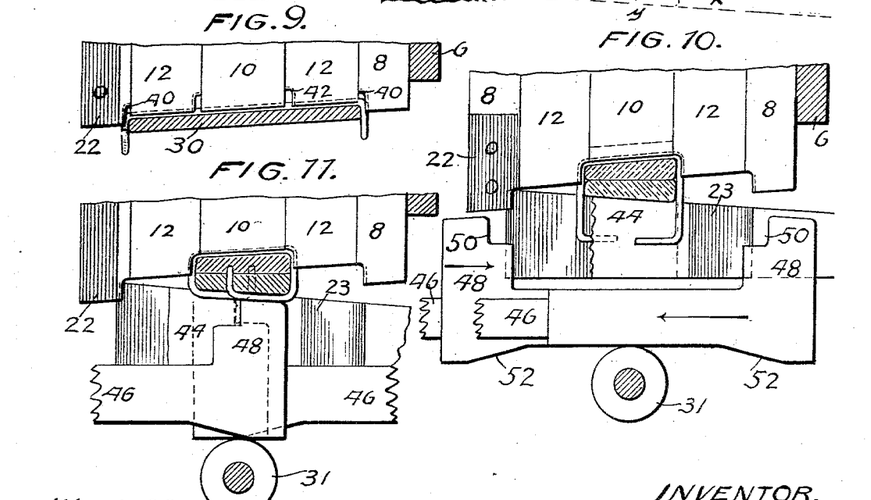

Arranged above the anvil 23 is a vertically-sliding plunger that is mounted in fixed guideways secured to the front of the standard 3. A projection 4 is supported upon the front of the standard 3, and secured thereto is the plate 6, (see Fig. 2,) which forms the front guideway for the vertically-reciprocating plunger. This plunger is formed in three parts—an outer part 8, (see Figs. 8 and 18,) a central part 10, (see Figs. 8 and 20,) and an intermediate part 12. (See Figs. 8 and 19.) The outer part 8 is centrally recessed, as shown in Fig. 18, and within this recess is placed the intermediate part of the plunger 12. This intermediate part 12 is also centrally recessed, and within it is placed the central part 10. The outer part 8 of the plunger is provided with the roller 14, that fits within the groove in the cam 15 and by means of which said plunger is given a vertically-reciprocating movement. The lower ends of the parts or sections 10 and 12 and of one part of the plunger 8 are provided with a groove 16, so that when the lower ends of these several parts of the plunger are at the same height from the anvil the sections of the groove 16 coincide, thereby forming a continuous groove, into which the wire passes as it is fed beneath the plunger by the means already described. The edge of the part 8 of the plunger that is nearest the opening through which the wire is fed is provided with a knife 22, which coöperates with an adjustable knife 18, held in position by screws 20 and 24 (see Figs. 12, 13, and 14) and serves to sever the wire at the beginning of the downward stroke of said plunger. A steel bushing 26 is preferably arranged in the wall of the casing in front of the feed-dog 135, and through this bushing the wire is passed. I provide a wire-holder which consists of a pivoted plate 28, (see Figs. 7 and 8,) that is supported upon a fixed portion of the framework of the machine close to the reciprocating plunger, said holder being of the width of the two parts 10 and 12 of the plunger. This holder is provided at its lower end with a lip 30, and a spring 32, secured to the frame of the machine, holds this lip normally under the ends of the two parts 10 and 12 of the plunger, as shown in Figs. 7, 8, and 9. The part 10 of the plunger is provided with a screw 34, that passes through a slot in the part 12 and also through a slot in the part 8 of the plunger. (See Figs. 17, 18, and 19.) The part 8 of the plunger is also provided with a lug 36, that extends through a slot in the part 12 of the plunger and into a recess 38 in the wire-holder 28. The under surface of the lug 36 and the bottom wall of the recess 38 are beveled or inclined, so that when the plunger 8 has reached a predetermined point in its downward movement this inclined surface of the lug engages the inclined surface of the wall of the recess, and thereby said wire-holder is moved back into the position shown by dotted lines in Fig. 7. The lower end of the part 8 of the plunger is recessed, as shown in Fig. 18, and the lower end of the part 12 is recessed, as shown in Fig. 19, and the inner edges of the depending portions of the parts 8 and 12 are provided, respectively, with the notches 40 and 42, as shown in Figs. 8, 18, and 19. When, therefore, the wire has been fed through the sleeve or bushing 26, it will lie in the groove 16 in the lower end of the plunger, and it will be supported beneath the parts 10 and 12 of the plunger by the wire-holder 28, as it will rest upon the lip 30 of said wire-holder. The first downward movement of the plunger will cause only the part 8 to descend, the other parts 10 and 12 of the plunger being held up by said wire-holder 28. (See Fig. 17.) This movement of the part 8 of the plunger will sever the wire close to the bushing 26 and will turn its ends down over the ends of the lip 30 of the wire-holder 28, so that the wire will assume the position shown in Fig. 9. A further movement of the part 8 of the plunger will cause the wire-holder 28 to be withdrawn from under the ends 10 and 12 of the plunger and from under the wire, and the wire will then drop upon the overlapped ends of the hoop. The further movement of the plunger brings the part 10 firmly upon top of the wire, so as to partially embed the wire in the surface of the hoop, and causes the part 12 of the plunger to bend the wire down over the hoop into the position shown in Fig. 10, and this last movement of the wire carries its ends down between the two parts of the anvil and upon opposite sides of the central plate 44.

(Shown in Figs. 14 and 10.) For the purpose of finishing the movement of the wire I provide two oppositely-moving clencher-bars 46, each carrying a vertically-projecting blade 48, that projects into the space between the wall of the anvil and the plate 44. (See Fig. 14.) These plates are provided with the recesses 50, (see Fig. 10,) which are adapted to engage the bends in the wire staple and turn the same up against the under side of the hoop, moving them from the position shown in Fig. 10 to that shown in Fig. 11. Clencher-bars 46 are provided with the inclines 52, and as said bars move past each other these inclines ride over the rolls 31, thereby raising the rear ends of the bars and forcing the points of the staples into the hoop, bringing the bars and the points of the staples into the position shown in Fig. 11, and thereby completing the operation of setting the fastening.

For the purpose of operating the clencher-bars the rack-bars 54 are provided, to which said clencher-bars are secured. These rack-bars are each provided with a series of teeth and they engage a pinion 56, arranged between them, as shown in Fig. 15, and the rear ends of said bars slide in the suitable bracket or support 58. (See Figs. 1, 3, and 15.) One of said bars 54 is connected by suitable pins 60 to an operating-bar 62, said bar being provided with a loop 64, which passes around the shaft 9, and with a roll or pin 66, that engages the surface of the cam 19. A spring 68 is connected to the frame of the machine and to a lug 70 on the bar 62, and holds said bar 62, with its roll, in contact with the surface of the cam 19. As the shaft 9 is rotated the bar 62 is reciprocated, and the rack-bars 54 are moved in opposite directions, thereby moving the clencher-bars past each other and clenching the ends of the staples in the manner already described.

The driving-pulley 7 is loosely mounted upon the shaft 5, and a clutch 7' (see Fig. 1) is arranged upon said shaft and is operated for connecting the shaft and the driving-pulley at suitable intervals when the fastening is to be applied to the hoop. Any suitable construction of clutch may be used for this purpose, and hence the details of the construction are not shown in the drawings. The clutch is provided with a suitable lug 72, and an operating-rod 74 is arranged upon the casing of the machine and is provided with a lug 76, that is adapted to engage the lug 72 of the clutch. A spring 78 is provided between projections 80 upon the casing of the machine and serves to throw the lug 76 into engagement with the clutch-lug 72 and thereby to operate the clutch and disconnect the driving-pulley 7 from the shaft 5. The operating-rod 74 is connected to a bell-crank lever 84, and a projecting arm 82 is provided upon the treadle 49 in position to engage one arm of said bell-crank lever.

With this construction the spring 78 holds the lug 76 in engagement with the lug 72 upon the clutch 7' and thereby holds said clutch out of engagement with the shaft 5. When pressure is applied to the treadle 49, the first downward movement thereof expands the hoop and forces the clamp 35 down upon it, so as to hold it firmly in position. The further movement of the treadle causes the arm 82 to engage the bell-crank lever 84 and through the operating-rod 74 draws the lug 76 out of engagement with the clutch-lug 72. The clutch being released from the lug 76 immediately engages the driving-pulley with the shaft 5, and through the shaft 5 the parts of the machine already referred to are operated for the purpose of forming and applying the wire staple or fastening device. A buffer or stop 90 may be arranged on the casing to be engaged by the treadle when it is drawn up by the spring connected to the expanding-bars. The wire forming the staple is embedded for about one-half of its diameter in the surface of the hoop, and the ends of the staple are embedded or driven into the inner surface of the hoop. This makes it impossible for the parts of the hoop to slip no matter how much strain or pressure is brought upon it.

In general practice two staples or fastenings are applied to each hoop, and after one staple has been applied the hoop is released and turned into position to have a second staple applied, as shown in Fig. 2 of the drawings, and while, with the mechanism shown, the expanding device will be operated each time that the treadle is depressed for the purpose of tripping the clutch-holding device it will be understood that after one staple is applied to the hoop it will not be necessary to again expand the hoop, and hence, if preferred, a separate lever may be provided for operating the clutch-tripping device when it is desired to insert a staple without first expanding the hoop.

Any number of staples may be applied to each hoop, although two will be found sufficient for a firm fastening.

Instead of applying one fastening and then moving the hoop and applying another I may provide the machine with two or more staple-applying machines and apply two or more staples or fastenings simultaneously.

The hoop-expander may obviously be formed separately from the rest of the machine and the hoop be expanded and sized in one machine and its overlapped ends be temporarily fastened as by the use of a tack or small nail, and then this machine may be used to permanently fasten the overlapped ends of the hoop. The staples may be formed separately and this machine be used to apply them to the overlapped ends of the hoop.

It will be readily understood that the details of construction may be modified in many ways without departing from my invention.

Having thus described my invention, I claim as new and desire to secure by Letters Patent—

1. The combination, with means for expanding the hoop and clamping its overlapped ends, of means for feeding the wire, a cutter for severing a suitable length of wire, means for forming bends in the ends of the wire, means for bending the wire around the overlapped ends of the hoop, and means for embedding the bent ends of the wire in the hoop, for the purpose set forth.

2. The combination, with means for clamping the overlapped end of a hoop, of a wire-feed, a cutter for severing a suitable length of wire, means for forming bends in the ends of the wire, means for bending the severed length of wire about the overlapped ends of the hoop, and means for embedding the bent ends of the wire in the hoop, for the purpose set forth.

3. The combination, with means for clamping the overlapped ends of a hoop, of a suitable wire-feed, a three-part plunger, means for operating said plunger to sever a length of wire, form bends in its ends, and bend it over the edges of the hoop, clencher-bars, and means for operating said bars to embed the bent ends of the wire in the hoop, for the purpose set forth.

4. The combination, with the anvil for supporting the overlapped ends of the hoop, and the clamp for holding said ends, of the three-part plunger, the wire-holder extending beneath the ends of the central and intermediate parts of the plunger, and means for operating the parts of said plunger in succession to sever a length of wire and form it into a staple around the overlapped ends of the hoop, and means for withdrawing said wire-holder when said plunger descends to form said staple, for the purpose set forth.

5. The combination, with means for holding the hoop, of the wire-feed, the plunger for forming bends in the ends of the wire and bending the same around the hoop, and the reciprocating clencher-bars for embedding the bent ends of the wire in the hoop, and means for operating said plunger and clencher-bars, for the purpose set forth.

6. The combination, with the reciprocating plunger, formed in three parts, and having the wire-receiving groove in its lower end, of the swinging wire-holder adapted to extend beneath the central and intermediate parts of the plunger, the spring engaging said wire-holder, means for operating the parts of said plunger in succession, and means for withdrawing said wire-holder, for the purpose specified.

7. The combination, with the reciprocating plunger, consisting of the outer part 8, the intermediate part 12 and the central part 10, each of said parts being formed with a wire-receiving groove in its lower end, means for operating the parts of said plunger in succession, and the swinging wire-holder 28 provided with the lip 30 adapted to extend beneath the parts 10 and 12 of the plunger, and the spring 20 engaging said wire-holder, for the purpose set forth.

8. The combination, with the wire-holder having the lip 30, of the plunger, said plunger consisting of the parts 8, 10 and 12, each provided in its lower end with the groove 16, the part 8 being provided with the recesses 40 and the part 12 with the recesses 42, said wire-holder being arranged with its lip in position to extend beneath the parts 10 and 12 of the plunger, and means for operating the parts of said plunger in succession, for the purpose set forth.

9. The combination, with means for holding the hoop and means for feeding the staple and bending it around said hoop, of the reciprocating clencher-bars 46 provided with the inclines 52 and the rolls 31 upon which said clencher-bars rest, and means for operating said clencher-bars, for the purpose set forth.

10. The combination, with the two-part anvil 23 provided with the plate 44 arranged between the two parts of said anvil, of the reciprocating clencher-bars arranged to reciprocate upon opposite sides of said plate 44, for the purpose set forth.

11. The combination, with the two-part anvil 23, of the hoop-clamp 35 arranged over said anvil, means for forming a staple, forming bends in its ends, and bending said staple around a hoop, and the reciprocating clencher-bars for embedding the ends of the staple in the hoop, for the purpose set forth.

12. The combination, with means for sizing and clamping a hoop, a treadle for operating said sizing and clamping means, a staple forming and applying mechanism, and means connected with said treadle for putting said staple forming and applying mechanism in operation after said hoop is sized and clamped.

In testimony whereof I have hereunto set my hand this 12th day of September, A. D. 1896.

CLARENCE O. WHITE.

In presence of—
A. C. PAUL,
M. E. GOOLEY.